US011567563B2

(12) United States Patent
Keen et al.

(10) Patent No.: US 11,567,563 B2
(45) Date of Patent: Jan. 31, 2023

(54) ADAPTING EXTENDED REALITY APPLICATIONS TO USER CAPABILITY AND PREFERENCE

(71) Applicant: INTERNATIONAL BUSINESS MACHINES CORPORATION, Armonk, NY (US)

(72) Inventors: Martin G. Keen, Cary, NC (US); Sarbajit K. Rakshit, Kolkata (IN); John M. Ganci, Jr., Raleigh, NC (US); James E. Bostick, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 16/947,373

(22) Filed: Jul. 30, 2020

(65) Prior Publication Data

US 2022/0035440 A1 Feb. 3, 2022

(51) Int. Cl.
*G06F 3/01* (2006.01)
(52) U.S. Cl.
CPC .................................. *G06F 3/011* (2013.01)
(58) Field of Classification Search
None
See application file for complete search history.

(56) References Cited

U.S. PATENT DOCUMENTS

| 5,963,891 | A | 10/1999 | Walker |
| 6,244,987 | B1 | 6/2001 | Ohsuga |
| 7,840,031 | B2 | 11/2010 | Albertson |
| 9,067,136 | B2 | 6/2015 | Langridge |
| 9,292,085 | B2 | 3/2016 | Bennett |
| 9,448,689 | B2 | 9/2016 | Sakamoto |
| 2017/0265783 | A1 | 9/2017 | Letchner |
| 2017/0278306 | A1* | 9/2017 | Rico ................... G02B 27/0093 |
| 2018/0024623 | A1 | 1/2018 | Faaborg |
| 2021/0173471 | A1* | 6/2021 | Johnson .................. G06F 3/013 |

OTHER PUBLICATIONS

Mell, et al., "The NIST Definition of Cloud Computing", National Institute of Standards and Technology, Special Publication 800-145, Sep. 2011, 7 pages.

* cited by examiner

*Primary Examiner* — Aneeta Yodichkas
(74) *Attorney, Agent, or Firm* — Elliot J. Shine

(57) ABSTRACT

A method, computer system, and a computer program product for modifying XR applications is provided. The present invention may include receiving capability input associated with the capabilities of the user. The present invention may include determining operational requirements of an XR application. The present invention may include determining movement capabilities of the user. The present invention may include generating a movement capabilities profile. The present invention may include determining differences between the operational requirements of the XR application and the movement capabilities profile of the user. The present invention may include modifying the operational requirements of the XR application based on the determined differences. The present invention may include monitoring the user's participation in the XR application with modified operational requirements.

20 Claims, 5 Drawing Sheets

ADAPTING EXTENDED REALITY APPLICATIONS TO USER CAPABILITY AND PREFERENCE

BACKGROUND

The present invention relates generally to the field of computing, and more particularly to extended reality applications.

Extended Reality ("XR") refers to all real-and-virtual combined environments and human-machine interactions generated by computer technology and wearables, where 'X' represents a variable for any current or future spatial computing technologies (e.g., It includes representative forms such as augmented reality (AR), mixed reality (MR) and virtual reality (VR) and the areas interpolated among them). XR simulation involves a source of content (e.g., software) and a user device (e.g., hardware).

XR devices (e.g., headsets, all-direction treadmills, special gloves, goggles, smart phones) can track a user's movements (e.g., head movements, eye direction and physical movements) and translate those movements into virtual ones. These XR devices provide users an immersive sensory experience within a wide array of XR applications. XR applications may require a user to perform certain physical movements to meaningfully participate within an XR space. For example, an XR application may require a user to reach an object within the environment to accomplish a certain task.

SUMMARY

Embodiments of the present invention disclose a method, computer system, and a computer program product for modifying XR applications. The present invention may include receiving capability input associated with the capabilities of the user. The present invention may include determining operational requirements of an XR application. The present invention may include determining movement capabilities of the user. The present invention may include generating a movement capabilities profile. The present invention may include determining differences between the operational requirements of the XR application and the movement capabilities profile of the user. The present invention may include modifying the operational requirements of the XR application based on the determined differences. The present invention may include monitoring the user's participation in the XR application with modified operational requirements.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

As described previously, Extended Reality ("XR") refers to all real-and-virtual combined environments and human-machine interactions generated by computer technology and wearables, where 'X' represents a variable for any current or future spatial computing technologies (e.g., It includes representative forms such as augmented reality (AR), mixed reality (MR) and virtual reality (VR) and the areas interpolated among them). XR simulation involves a source of content (e.g., software) and a user device (e.g., hardware).

XR devices (e.g., headsets, all-direction treadmills, special gloves, goggles, smart phones) can track a user's movements (e.g., head movements, eye direction and physical movements) and translate those movements into virtual ones. These XR devices provide users an immersive sensory experience within a wide array XR applications. XR applications may require a user to perform certain physical movements to meaningfully participate within an XR space. For example, an XR application may require a user to reach an object within the environment to accomplish a certain task.

XR applications may require a user to crouch, reach up, bend down and so forth. Physical movement capabilities of users may vary. As a result, a user may not be able to effectively interact within an XR space and/or may be encouraged to perform physical movements outside a user's capabilities, which may result in injury.

Embodiments of the present invention will now be described in detail with reference to the accompanying Figures.

Figure 1:
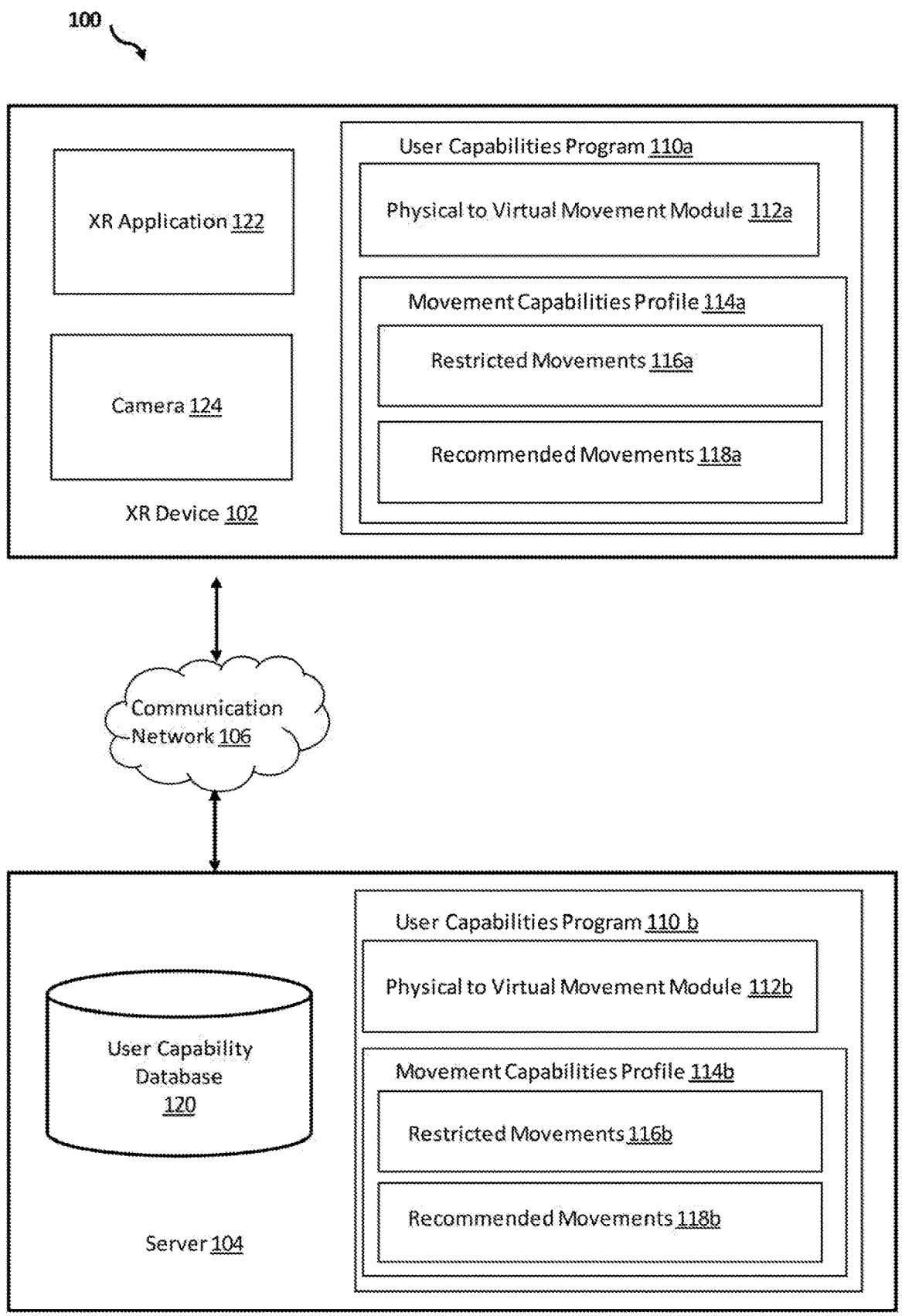
FIG. 1 illustrates a networked computer environment according to at least one embodiment.

FIG. 1 illustrates an XR system 100, in accordance with an example embodiment of the invention. In an example embodiment, XR system 100 includes an XR Device 102 and a Server 104 interconnected via a communication network 106.

In the example embodiment, communication network 106 is the Internet, representing a worldwide collection of networks and gateways to support communications between devices connected to the Internet. Communication network 106 may include, for example, wired, wireless or fiber optic connections. In other embodiments, communication network 106 may be implemented as an intranet, a local area network (LAN), or a wide area network (WAN). In general, communication network 106 can be any combination of connections and protocols that will support communications between the XR device 102 and the Server 104.

According to various implementations of the present embodiment, the user capabilities program 110a, 110b may interact with a user capability database 120 that may be embedded in various storage devices, such as, but not limited to an XR device 102, a server 104, or a cloud storage service.

XR device 102 may be a headset, a handheld device, a smart-phone, goggles, glasses, all-direction treadmill, full-body suit, a computer, or any other electronic device or computing system capable handling XR capabilities and receiving and sending data to and from other computing devices such as server 104 via communication network 106. In an example embodiment, XR device 102 is a computing device that is optimized to track a user's movements (e.g., head movements, eye direction and physical movements) and translate those movements into virtual ones. As will be discussed with reference to FIG. 3, XR device 102 may include internal components 902b and external components 904b, respectively. XR device 102 may include a camera 124 (e.g., sensors, locomotion tracking systems) or any other motion tracking devices (e.g., infrared tracking sensors, radar tracking sensors). The camera 124 may be capable of capturing a user's performance in an XR application 122. XR device 102 may include an XR application 122. XR device 102 may be able to run a user capabilities program 110a (hereinafter referred to as "user capabilities program 110"). User capabilities program 110 may include a physical to virtual movement module 112a (hereinafter referred to as "physical to virtual movement module 112") and a movement capabilities profile 114a (hereinafter movement capabilities profile 114). The movement capabilities profile may include restricted movements 116a (hereinafter "restricted movements 116) and recommended movements 118a (hereinafter "recommended movements 118").

Server 104 may operate in a cloud computing service model, such as Software as a Service (SaaS), Platform as a Service (PaaS), or Infrastructure as a Service (IaaS). Server 104 may be located in a could computing deployment model, such as a private cloud, community cloud, public cloud, or hybrid cloud. As will be discussed with reference to FIG. 3, server 104 may include internal components 902a and external components 904a, respectively. Server 104 may include a user capability database 120 capable of receiving and storing capability input. Server 104 may be able to run a user capabilities program 110b (hereinafter referred to as "user capabilities program 110"). User capabilities program 110 may include a physical to virtual movement module 112b (hereinafter referred to as "physical to virtual movement module 112") and a movement capabilities profile 114b (hereinafter movement capabilities profile 114). The movement capabilities profile may include restricted movements 116b (hereinafter "restricted movements 116) and recommended movements 118b (hereinafter "recommended movements 118").

The user capability database 120 may be capable of receiving capability input associated with the capabilities of the user from a plurality of sources (e.g., wearable movement data, medical records, visual input, observed movement behavior, user feedback).

The user capability database 120 may be capable of receiving and storing capability input received from a user's wearable device (e.g., smart watch, fitness tracker). The user's wearable device may utilize an accelerometer or gyroscope sensors to record movement data. Movement data may be data such as steps walked, stairs climbed, and so forth. The user's wearable device may also include sensors capable of capturing other data, such as, for example, a speed a user can walk, how far a user can crouch, and how active a user may be.

The user capability database 120 may be capable of receiving and storing capability input received from medical records. A user's medical records may include physical movement restrictions. Physical movement restrictions may include temporary restrictions or permanent restrictions. Medical records may also include physical movement recommendations to recover from an injury.

The user capability database 120 may be capable of receiving and storing capability input received from visual input.

The user capability database 120 may be capable of receiving and storing capability input received from observed movement behavior. Observed movement behavior may be user movements tracked by XR device 102 from previously performed XR sessions of the XR application 122 or a user's performance in a different XR application or game.

The user capability database 120 may be capable of receiving and storing capability input received from user feedback. User feedback may be the user rating the difficulty of movements performed within an XR application 122. User feedback may include flagging certain movements performed within an XR application 122.

XR Device 102 may include an XR application 122.

XR application 122 (e.g., Augmented Reality application, Mixed Reality application, Virtual Reality application) may run a real-and-virtual or exclusively virtual computer-generated environment which may include interactive components within the environment. The XR device 102 (e.g., headsets, all-direction treadmills, special gloves, goggles, smart phones) may translate a user's movements into that computer-generated environment. The XR device 102 may also utilize a camera 124 (e.g., infrared tracking stations, sensors, locomotion tracking systems) or other motion tracking devices to translate a user's movements into that computer-generated environment.

An XR application 122 may include XR application operational requirements. XR application operational requirements may be movements which a user may have to perform in real life to meaningfully interact within the computer-generated environment (e.g., bend down to pick up a virtual object, crouch down to avoid enemy fire). Within a computer-generated environment objects may be plotted in space such that there may be a defined distance between objects and a defined distance between the user and objects. XR operational requirements may be the same for all users (e.g., reach 2 feet to the right).

Physical to virtual movement module 112 receives capability input from the user capabilities database 120. Physical to virtual movement module 112 may process capability input (e.g., wearable movement data, medical records, visual input, observed movement behavior, user feedback) received from the user capability database 120. Physical to virtual movement module 112 may aggregate the capability input and may determine what capability input receives greater influence (e.g., favoring recent user capability input). Physical to virtual movement module 112 may utilize capability input from different sources (e.g., medical records and visual input) to determine a user's movement capability with respect to certain movements (e.g., medical records indicating right shoulder surgery and limited right arm movement observed by visual input). Physical to virtual movement module 112 may determine the movement capabilities profile 114 of the user. The physical to virtual movement module 112 may determine the movement capabilities of the user with respect to types of movements and the associated body part(s) for the type of movement. The physical to virtual movement module 112 may modify the movement capabilities profile 114 of the user with updated capability input associated with the capabilities of the user.

The physical to virtual movement module 112 may generate the movement capabilities profile 114 of the user. The movement capabilities profile of the user may store restricted movements 116 (e.g., limitations in the capabilities of the user) and recommended movements 118 (e.g., movements beneficial to the user, movements determined to assist the user's recovery from an injury) generated by the physical to virtual movement module 112.

Figure 2:
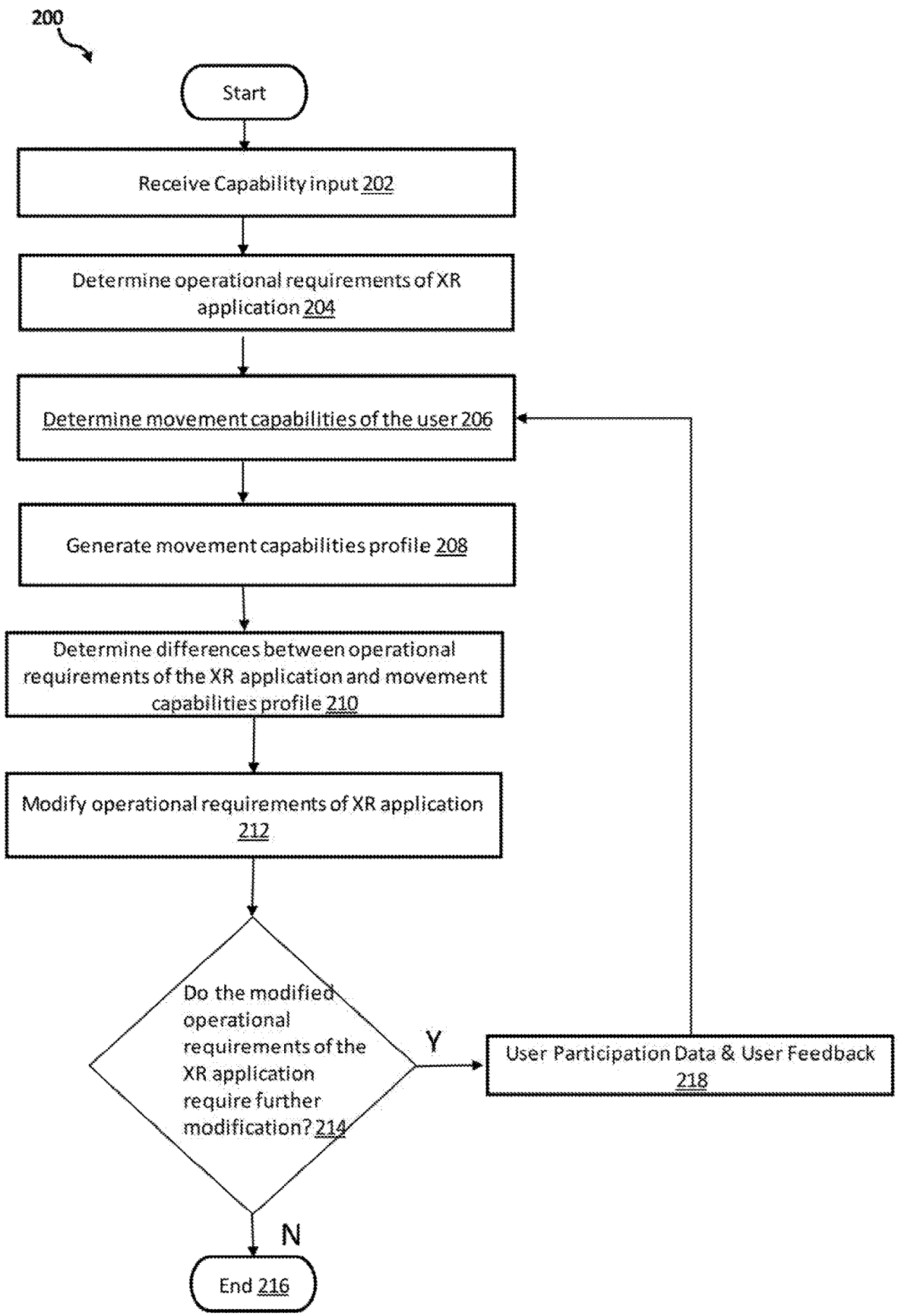
FIG. 2 is an operational flowchart illustrating a process for modifying an XR application according to at least one embodiment.

FIG. 2 is a flowchart illustrating the steps of the user capabilities program 110, in accordance with an embodiment of the invention.

At 202, the user capabilities program 110 may receive capability input associated with the capabilities of the user from the user capability database 120. The user capability database 120 may receive capability input from a plurality of sources (e.g., wearable movement data, medical records, visual input, observed movement behavior, user feedback).

At 204, the user capabilities program 110 may determine operational requirements of the XR application 122. The user capabilities program 110 may determine required movements of the operational requirements for the XR application 122. Required movements may be movements a user is required to perform in order for the user to meaningfully participate (e.g., complete tasks) within the XR application. The user capabilities program 110 may determine intensity values for the required movements. The intensity value may be a numerical value to represent the difficulty of the required movement. The user capabilities program 110 may consider movement information, such as, for example, movement distance, movement speed, associated body parts, time required in a position, simultaneous movements, what movements have been previously performed, what movements still require performance, to determine an intensity value for the required movement. The user capabilities program 110 may determine associated body part(s) for required movements of the operational requirements for the XR application 122.

At 206, the user capabilities program 110 may determine movement capabilities of the user. The user capabilities program 110 may utilize the physical to virtual movement module 112 to determine the movement capabilities of the user. The user physical to virtual movement module 112 may use capability input associated with the capabilities of the user from a plurality of sources to determine the movement capabilities of the user. The user capabilities program 110 may determine intensity values for the movement capabilities of the user.

The physical to virtual movement module 112 may determine which capability input receives greater influence (e.g., favoring recent capability input). The physical to virtual movement module 112 may utilize capability input from different sources (e.g., medical records and visual input) to determine the movement capabilities of the user with respect to different types of movements. The physical to virtual movement module 112 may use capability input to determine the movement capabilities of a body part of the user (e.g., medical records indicating limited right shoulder mobility). The user capabilities program 110 may determine an intensity value for the movement capabilities of a body part of the user.

The physical to virtual movement module 112 may utilize capability input to determine restricted movements 116. The physical to virtual movement module 112 may determine restricted movements 116 using determined movement capabilities of a body part of the user. The physical to virtual movement module 112 may determine capability input, such as, for example, medical records receive greater influence in determining restricted movements 116. Restricted movements 116 may be movements. The user capabilities program 110 may determine intensity values for the restricted movements 116. The intensity value for a restricted movement 116 may correspond to the range of motion of that restricted movement 116. The intensity value may be a numerical value to represent the range of motion of the restricted movements 116. The determined intensity value for a restricted movement 116 may be adjusted to prevent injury of the user.

The physical to virtual movement module 112 may utilize capability input to determine recommended movements 118. The physical to virtual movement module 112 may determine recommended movements 118 using determined movement capabilities of a body part of the user. The physical to virtual movement module 112 may determine the influence of capability input from various sources, such as, for example, medical records may receive greater influence in determining recommended movements 118. Recommended movements 118 may be movements determined to be beneficial (e.g., assist in user's recovery from injury) to the user. The user capabilities program 110 may determine intensity values for the recommended movements 118. The intensity value for a recommended movement 118 may correspond to the range of motion of that recommended movement 118. The intensity value may be a numerical value to represent the range of motion of the recommended movements 118. The determined intensity value of the recommended movement 118 may be adjusted to facilitate recovery of the user.

The physical to virtual movement module 112 may update the determined movement capabilities of the user based on the user's participation in the XR application 122 with modified operational requirements. The physical to virtual movement module 112 may update the determined movement capabilities of the updated capability input received by the user capability database 120.

At 208, the user capabilities program 110 may generate a user movement capabilities profile 114. The user movements capability profile 114 may store intensity values for movement capabilities of the user, such as, for example, intensity values for a body part of the user, intensity values for different types of movements, intensity values for restricted movements 116, intensity values for recommended movements 118. The user movement capabilities profile 114 may store restricted movements 116 (e.g., limitations in the physical capabilities of a user) and the determined intensity values for the restricted movements 116. The user movement capabilities profile 114 may store recommended movements 118 (e.g., movements beneficial to a user) and the determined intensity values for the recommended movements 118.

The user movement capabilities profile may have an associated body part(s) for the type of movement and may be based in part on restrictions and recommendations for the associated body part(s). The user capabilities program 110 may store the user movement capabilities profile.

At 210, the user capabilities program 110 may determine differences between the operational requirements of the XR application 122 and the movement capabilities profile 114 of the user. The user capabilities program 110 may compare the intensity values for the required movements of the operational requirements of the XR application 122 and the intensity values stored in the movement capabilities profile 114 of the user. The user capabilities program 110 may determine which operational requirements of the XR application 122 are outside the user's capabilities using the restricted movements 116 intensity values. The user capabilities program 110 may determine which operational requirements of the XR application 122 are within the user's capabilities using the recommended movements 118 intensity values.

At 212, the user capabilities program 110 may modify the operational requirements of the XR application 122 based on the determined differences between the operational requirements of the XR application 122 and the movement capabilities profile 114 of the user.

The user capabilities program 110 may adjust the required movements of the operational requirements of the XR application 122 that involve restricted movements 116 to be less than the intensity value of the restricted movement 116. The user capabilities program 110 may adjust the required movements of the operational requirements of the XR application 122 that involve recommended movements 118 that are greater than the intensity value of the recommended movement 118.

The XR application 122 with modified operational requirements may allow the user to meaningfully interact (e.g., participate, complete objectives, safely interact) in the XR application 122 computer generated environment.

At 214, the user capabilities program 110 determines whether the modified operational requirements of the XR application 122 require further modification. If the modified operational requirements of the XR application 122 do not require further modification, the user capabilities program proceeds to step 216. If the modified operational requirements of the XR application 122 do require further modification, the user capabilities program 110 proceeds to step 218.

At 216, if the modified operational requirements of the XR application 122 do not require further modification, the modified operational requirements of the XR application 122 are not further modified. No further modification may indicate that user feedback was positive, no user feedback was provided.

At 218, if the modified operational requirements of the XR application do require further modification, the user capabilities program 110 may generate user participation data and user feedback data. The generated user participation data and user feedback data may be received by the physical to virtual movement module 112. The physical to virtual movement module 112 may utilize the user participation data and user feedback data to update (e.g., modify, adjust) the movement capabilities profile 114 of the user. The physical to virtual movement module 112 may aggregate the user participation data and the user feedback data to existing capability input associated with the capabilities of the user. The physical to virtual movement module 112 may determine that the user participation data and the user feedback data receive greater influence in updating the movement capabilities profile 114 of the user.

User participation data may be visual input (e.g., captured video stream) of the user's participation in the XR application 122 with modified operational requirements. The user capabilities program 110 may compare visual input of the user's participation in XR application 122 with modified operational requirements to the movement capabilities profile 114 of the user. The user capabilities program 110 may determine whether the user stays within, or goes beyond, the movement capabilities profile 114. The user capabilities program 110 may determine whether the user stays within, or goes beyond, restricted movements 116 and recommended movements 118. The user capabilities program 110 may utilize user feedback (e.g., verbal, facial cues, audible cues) to determine the user's comfort staying within or going beyond the intensity values stored in the movement capabilities profile 114.

User feedback may include manual input from the user. Manual input from the user may rating the difficulty (e.g., 1 to 10) of certain movements.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
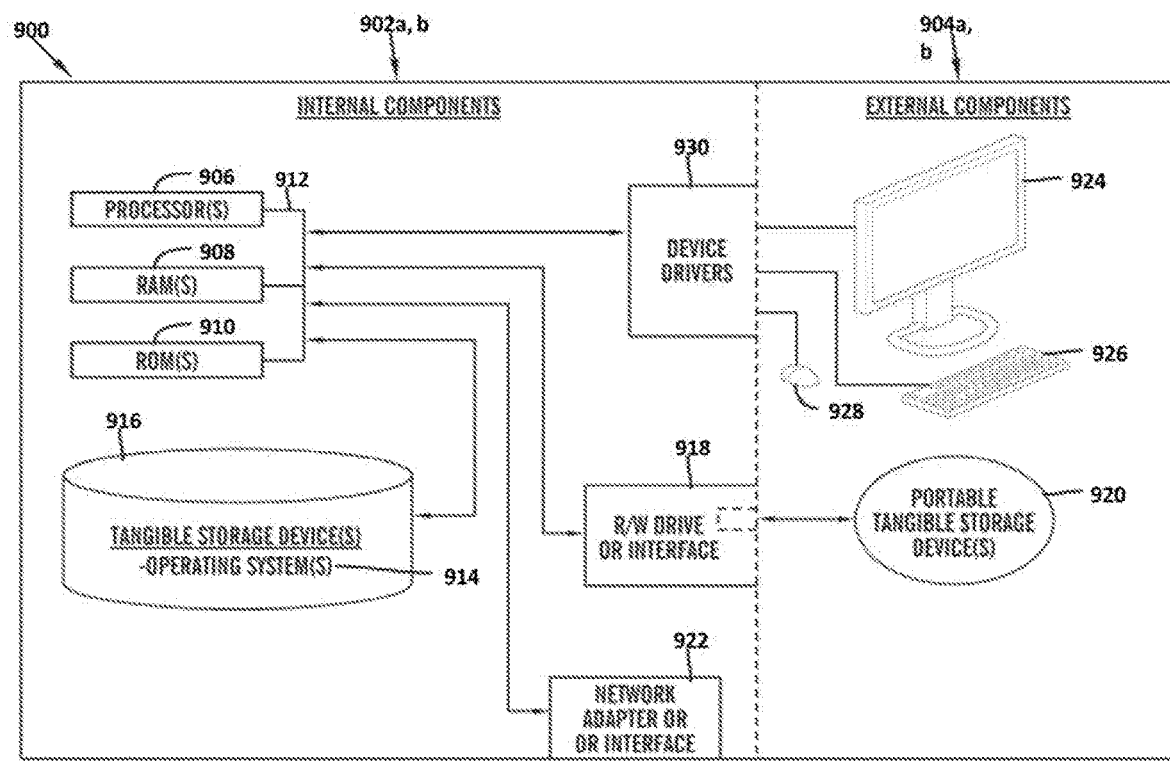
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

XR device 102 and server 104 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914 and the user capabilities program 110a in XR device 102, and the user capabilities program 110b in server 104, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program and the user capabilities program 110a and 110b can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The user capabilities program 110*a* in XR device 102 and the user capabilities program 110*b* in network server 104 can be downloaded from an external computer (e.g., server) via a network (for example, the Internet, a local area network or other, wide area network) and respective network adapters or interfaces 922. From the network adapters (or switch port adaptors) or interfaces 922, the user capabilities program 110*a* in XR device 102 and the user capabilities program 110*b* in server 104 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
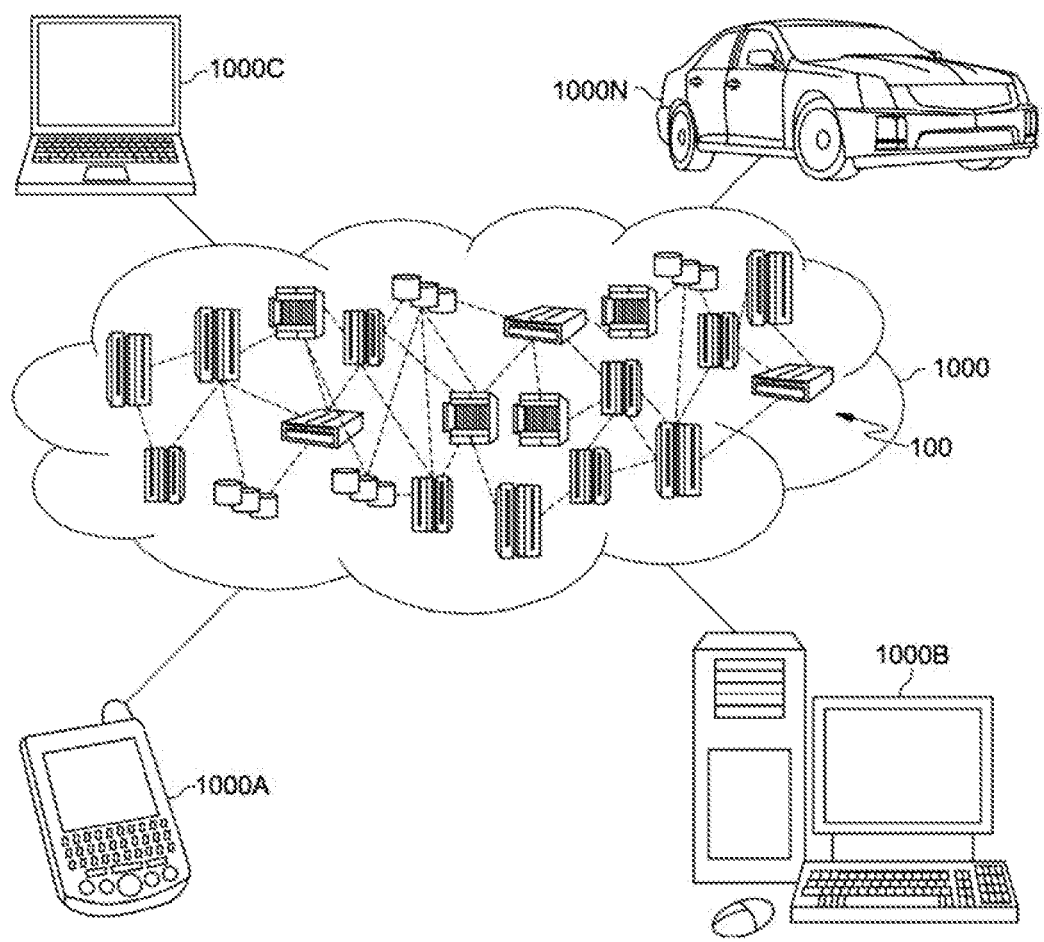
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
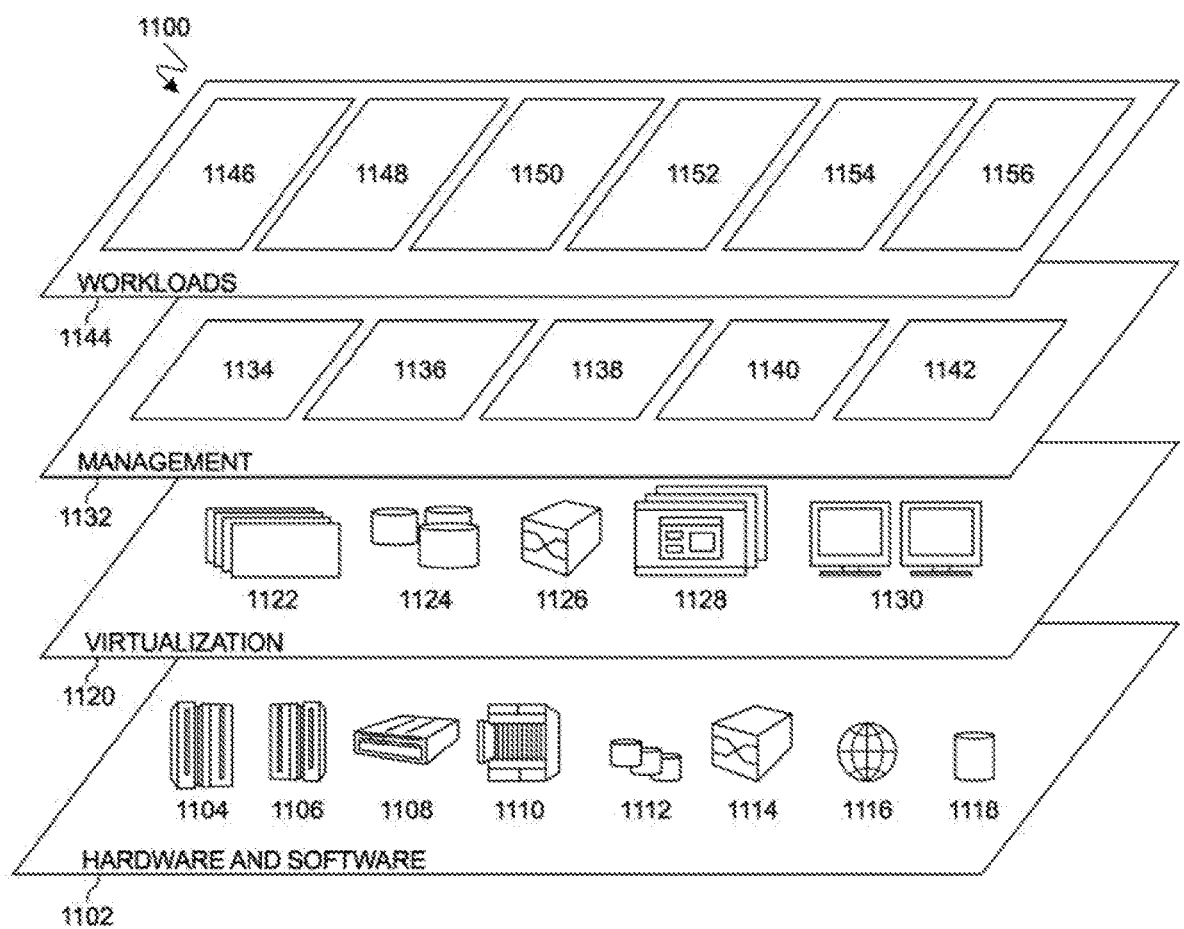
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and modifying XR applications 1156. A user capabilities program 110a, 110b provides a way to modify XR applications to a user's capabilities and preferences.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for modifying XR applications, the method comprising:
   determining operational requirements of an XR application, wherein the operational requirements of the XR application include required movements, and wherein the required movements have an intensity value;
   determining movement capabilities of a user, wherein the movement capabilities of the user comprises capability input of the user from a plurality of sources, and wherein the movement capabilities of the user have an intensity value, wherein the intensity value for each of the required movements is a numerical value representing a difficulty of each of the required movements to the user;
   generating a movement capabilities profile, wherein the movement capabilities profile includes one or more restricted movements specific to the user;
   determining differences between the operational requirements of the XR application and the movement capabilities profile of the user;
   modifying the operational requirements of the XR application based on the determined differences, wherein the operational requirements are modified by adjusting the required movements of the XR application that involve one or more restricted movements to be less than the restricted movement; and
   monitoring the user's participation in the XR application with modified operational requirements.

2. The method of claim 1, wherein determining the required movements for the operational requirements of the XR application further comprises:
   determining the intensity value of the required movements; and
   determining an associated body part for the required movement.

3. The method of claim 1, wherein determining the movement capabilities of the user further comprises:
   utilizing capability input from a plurality of sources to determine the movement capabilities of a body part of the user, wherein the capability input is weighted depending on a source;
   determining the movement capabilities of the user using the movement capabilities of the associated body part of the user; and
   determining the intensity value of the movement capabilities of the user.

4. The method of claim 1, wherein the one or more restricted movements is assigned an intensity value specific to the user corresponding to the range of motion of a body part, and wherein adjusting the required movements of the operational requirements of the XR application that involve restricted movements to be less than the intensity value of the one or more restricted movements.

5. The method of claim 1, wherein generating the movement capabilities profile further comprises:

determining recommended movements based on the capability input, wherein the recommended movements are specific movements beneficial to the user; and adjusting the required movements of the operational requirements of the XR application that involve recommended movements to be greater than the recommended movement.

6. The method of claim 5, wherein the determined recommended movement is assigned an intensity value corresponding to the range of motion of a body part, and wherein adjusting the required movements of the operational requirements of the XR application that involve recommended movements to be greater than the intensity value of the recommended movement.

7. The method of claim 6, wherein the intensity value of the recommended movement is adjusted to facilitate a recovery of the user.

8. The method of claim 1, wherein monitoring the user's participation in the XR application with modified operational requirements further comprises:
   determining whether the user stays within or goes beyond the user's generated movement capabilities profile;
   updating the movement capabilities of the user based on whether the user stays within or goes beyond the user's generated movement capabilities profile; and
   modifying the operational requirements of the XR application based on the updated movement capabilities of the user.

9. The method of claim 8, wherein updating the movement capabilities of the user based on whether the user stays within or goes beyond the user's generated movement capabilities profile further comprises:
   determining a user's comfort staying within or going beyond the user's generated movement capabilities profile, wherein a user's comfort is determined using verbal, facial, and audible cues recorded during a user's participation in the XR application with modified operational requirements.

10. A computer system for modifying XR applications, comprising:
   one or more processors, one or more computer-readable memories, one or more non-transitory computer-readable tangible storage medium, and program instructions stored in at least one of the one or more tangible storage medium for execution by at least one of the one or more processors via at least one of the one or more memories, wherein in the computer system is capable of performing a method comprising:
   determining operational requirements of an XR application, wherein the operational requirements of the XR application include required movements, and wherein the required movements have an intensity value;
   determining movement capabilities of a user, wherein the movement capabilities of the user comprises capability input of the user from a plurality of sources, and wherein the movement capabilities of the user have an intensity value, wherein the intensity value for each of the required movements is a numerical value representing a difficulty of each of the required movements to the user;
   generating a movement capabilities profile, wherein the movement capabilities profile includes one or more restricted movements specific to the user;
   determining differences between the operational requirements of the XR application and the movement capabilities profile of the user;

modifying the operational requirements of the XR application based on the determined differences, wherein the operational requirements are modified by adjusting the required movements of the XR application that involve one or more restricted movements to be less than the restricted movement; and
   monitoring the user's participation in the XR application with modified operational requirements.

11. The computer system of claim 10, wherein determining the movement capabilities of the user further comprises:
   determining the intensity value of the required movements; and
   determining an associated body part for the required movement.

12. The computer system of claim 10, wherein determining the movement capabilities of the user further comprises:
   utilizing capability input from a plurality of sources to determine the movement capabilities of a body part of the user, wherein the capability input is weighted depending on a source;
   determining the movement capabilities of the user using the movement capabilities of the associated body part of the user; and
   determining the intensity value of the movement capabilities of the user.

13. The computer system of claim 10, wherein generating the movement capabilities profile further comprises:
   determining recommended movements based on the capability input, wherein the recommended movements are specific movements beneficial to the user; and
   adjusting the required movements of the operational requirements of the XR application that involve recommended movements to be greater than the recommended movement.

14. The computer system of claim 10, wherein monitoring the user's participation in the XR application with modified operational requirements further comprises:
   determining whether the user stays within or goes beyond the user's generated movement capabilities profile;
   updating the movement capabilities of the user based on whether the user stays within or goes beyond the user's generated movement capabilities profile; and
   modifying the operational requirements of the XR application based on the updated movement capabilities of the user.

15. The computer system of claim 10, wherein monitoring the user's participation in the XR application with modified operational requirements further comprises:
   determining whether the user stays within or goes beyond the user's generated movement capabilities profile;
   determining a user's comfort staying within or going beyond the user's generated movement capabilities profile, wherein a user's comfort is determined using verbal, facial, and audible cues recorded during a user's participation in the XR application with modified operational requirements;
   updating the movement capabilities of the user based on whether the user stays within or goes beyond the user's generated movement capabilities profile; and
   modifying the operational requirements of the XR application based on the updated movement capabilities of the user.

16. A computer program product for modifying XR applications, comprising:
   one or more non-transitory computer-readable storage media and program instructions stored on at least one of the one or more tangible storage media, the program instructions executable by a processor to cause the processor to perform a method comprising:
one or more processors, one or more computer-readable memories, one or more computer-readable tangible storage medium, and program instructions stored in at least one of the one or more tangible storage medium for execution by at least one of the one or more processors via at least one of the one or more memories, wherein in the computer system is capable of performing a method comprising:
determining operational requirements of an XR application, wherein the operational requirements of the XR application include required movements, and wherein the required movements have an intensity value;
determining movement capabilities of a user, wherein the movement capabilities of the user comprises capability input of the user from a plurality of sources, and wherein the movement capabilities of the user have an intensity value, wherein the intensity value for each of the required movements is a numerical value representing a difficulty of each of the required movements to the user;
generating a movement capabilities profile, wherein the movement capabilities profile includes one or more restricted movements specific to the user;
determining differences between the operational requirements of the XR application and the movement capabilities profile of the user;
modifying the operational requirements of the XR application based on the determined differences, wherein the operational requirements are modified by adjusting the required movements of the XR application that involve one or more restricted movements to be less than the restricted movement; and
monitoring the user's participation in the XR application with modified operational requirements.

17. The computer program product of claim 16, wherein determining the movement capabilities of the user further comprises:
determining the intensity value of the required movements; and
determining an associated body part for the required movement.

18. The computer program product of claim 16, wherein determining the movement capabilities of the user further comprises:
utilizing capability input from a plurality of sources to determine the movement capabilities of a body part of the user, wherein the capability input is weighted depending on a source;
determining the movement capabilities of the user using the movement capabilities of the associated body part of the user; and
determining the intensity value of the movement capabilities of the user.

19. The computer program product of claim 16, wherein generating the movement capabilities profile further comprises:
determining recommended movements based on the capability input, wherein the recommended movements are specific movements beneficial to the user; and
adjusting the required movements of the operational requirements of the XR application that involve recommended movements to be greater than the recommended movement.

20. The computer program product of claim 16, wherein monitoring the user's participation in the XR application with modified operational requirements further comprises:
determining whether the user stays within or goes beyond the user's generated movement capabilities profile;
determining a user's comfort staying within or going beyond the user's generated movement capabilities profile, wherein a user's comfort is determined using verbal, facial, and audible cues recorded during a user's participation in the XR application with modified operational requirements;
updating the movement capabilities of the user based on whether the user stays within or goes beyond the user's generated movement capabilities profile; and
modifying the operational requirements of the XR application based on the updated movement capabilities of the user.

* * * * *